Aug. 9, 1932.    A. W. BOHN    1,870,229
ALTERNATING CURRENT MOTOR
Filed April 9, 1930
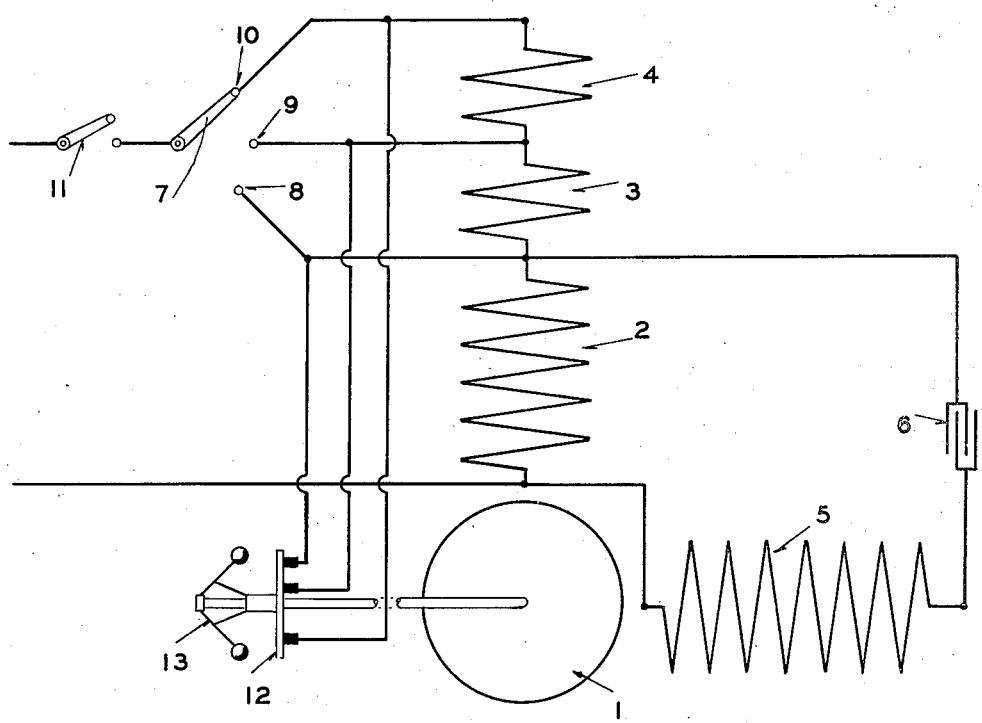
Inventor
August W. Bohn
By E. E. Huffman
Att'y.

Patented Aug. 9, 1932

1,870,229

UNITED STATES PATENT OFFICE

AUGUST W. BOHN, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed April 9, 1930. Serial No. 442,738.

My invention relates to improvement in variable speed split phase condenser motors. In such machines it is the practice to vary the speed by varying the number of turns of the main inducing winding, this winding being provided with taps for that purpose. But if the number of turns is adjusted to the lowest, or one of the lower speeds, and the starting and stopping of the machine is controlled automatically, such as by means of a thermostatic switch, the starting torque developed, which of course is considerably less when the machine is adjusted for its lowest speed, may not be sufficient to start it. It is the object of my invention to overcome this difficulty in a convenient manner.

The accompanying drawing diagrammatically illustrates a motor of the type referred to which is provided with my invention.

The induced member is diagrammatically indicated by the circle 1 and the inducing member is provided with a main inducing winding 2, having additional turn groups 3 and 4, for use to decrease the normal operating speed when the motor drives a fan or some other machine whose load is a function of speed. The inducing member also comprises an auxiliary inducing winding 5 displaced 90 electrical degrees from the main inducing winding and in circuit with the phase displacing condenser 6. 7 indicates a switch adapted to connect the line to the taps 8, 9 and 10 of the main inducing winding in accordance with the normal operating speed desired. 11 represents a main line switch automatically controlled in accordance with the variation in temperature or other condition by which it is desired that the operation or non-operation of the motor is determined.

My invention comprises providing the centrifugally controlled switch 12 which, when the motor is not operating, short-circuits the winding groups 3 and 4 of the main inducing winding. If switch 7 has been placed on tap 10 to cause the motor to operate at its lowest speed, the connections shown cause the full line voltage to be impressed upon the winding 2 while the switch 12 is closed, thus giving the machine its maximum starting torque. If switch 7 be on tap 9 at the time the line switch 11 is closed, the connections shown also result in full line voltage being impressed upon the winding 2. When the predetermined speed has been attained the centrifugal mechanism 13, which is driven by the motor as indicated, opens switch 12 and the switch 7 again determines what portion of the main inducing winding shall be effective during normal operation and, therefore, the operating speed of the machine.

Tests have shown that with my invention the starting torque for sub-maximum speed connections of the machine is substantially increased without serious increase in the starting current or heating of the windings, notwithstanding the fact that, during starting, switch 12 short-circuits group 4 or groups 3 and 4.

Having fully described my invention, what I claim as new and desire to secure by Letters Patent of the United States is:

1. In an adjustable speed alternating current motor, an induced member, an inducing member provided with a main inducing winding, a phase displacing circuit comprising an auxiliary inducing winding displaced from the main inducing winding, and centrifugally controlled means for rendering a portion of the turns of the main inducing winding inactive during operation of the machine at operating speeds below the lowest for which the motor is adjustable.

2. In an alternating current motor, an induced member, an inducing member provided with a main inducing winding, a phase displacing circuit comprising an auxiliary inducing winding displaced from the main inducing winding, auxiliary winding turns on the inducing member coaxial with the main inducing winding, a switch for short-circuiting said turns, and means maintaining said switch in open position during normal running of the machine and closed at starting.

3. In an alternating current motor, an induced member, an inducing member provided with a main inducing winding, connections whereby the line voltage will be impressed across such part or all of said induced winding turns as necessary to establish a selected operating speed, and centrifugally controlled means for causing said voltage to be impressed across a smaller number of turns of the inducing winding at starting.

In testimony whereof, I hereunto affix my signature, this 4th day of April, 1930.

AUGUST W. BOHN.